No. 613,490. Patented Nov. 1, 1898.
J. G. BUEHLER.
BALL BEARING.
(Application filed Apr. 8, 1897.)
(No Model.)
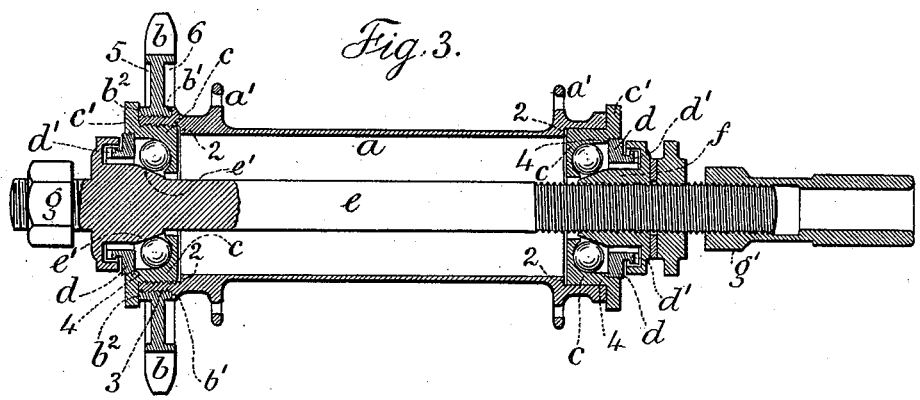
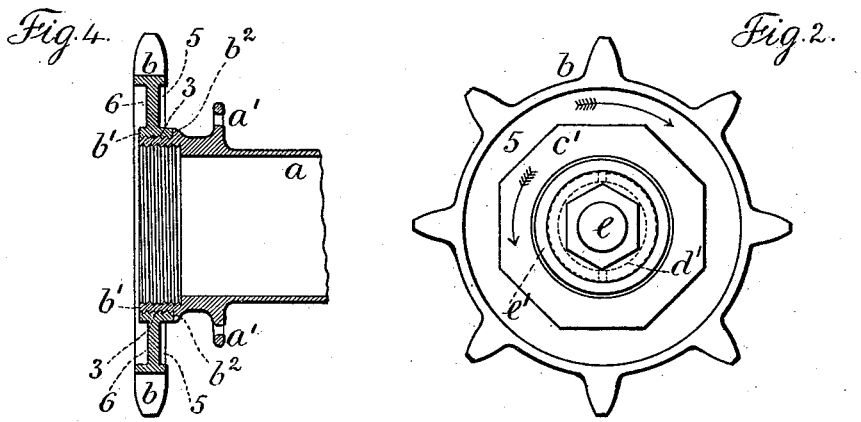
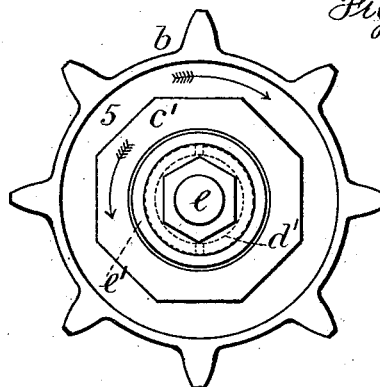
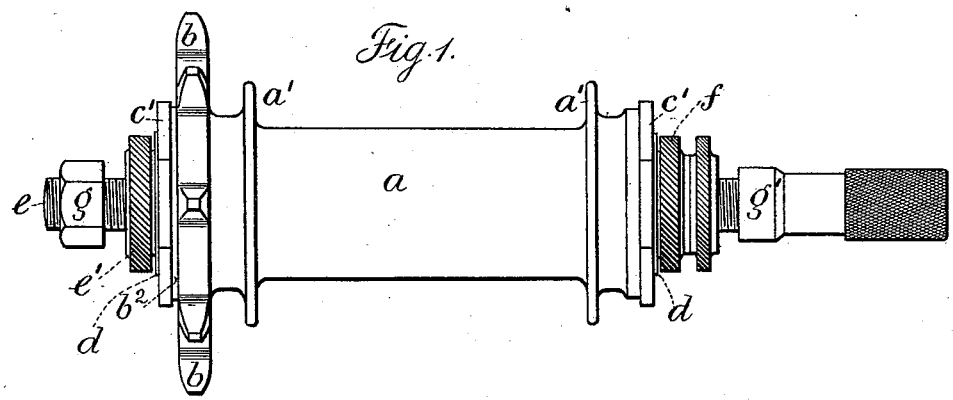
Witnesses:
J. Staib
Chas. H. Smith
Inventor:
John G. Buehler
by L. W. Serrell & Son
att'y
THE NORRIS PETERS CO., PHOTO-LITHO., WASHINGTON, D. C.

UNITED STATES PATENT OFFICE.

JOHN G. BUEHLER, OF NEW YORK, N. Y., ASSIGNOR TO BUEHLER & PLATT, OF SAME PLACE.

BALL-BEARING.

SPECIFICATION forming part of Letters Patent No. 613,490, dated November 1, 1898.

Application filed April 8, 1897. Serial No. 631,249. (No model.)

*To all whom it may concern:*

Be it known that I, JOHN G. BUEHLER, a citizen of the United States, residing at New York, (Brooklyn,) in the county of Kings and State of New York, have invented a new and useful Improvement in Ball-Bearings, of which the following is a specification.

My invention relates especially to ball-bearings for the wheels of cycles. Heretofore in several instances in these bearings the ball-race was a separate piece inserted and frictionally held in a removable screw-threaded cup-shaped ball-retainer, the ball-race being presumably brought up against the shoulder of the hub when the retainer was screwed down to place. These ball-races are liable to shift position, to warp in the act of hardening, and also to crack in use; and the object of my invention is to obviate such difficulties.

In carrying out my invention and in combination with a hub preferably of liberal proportions and known in the trade as a "barrel-hub" I employ a cup-shaped ball-race having an integral flange and a central removable ball-retainer and also a removable reversible sprocket that is held to place by the ball-race at one end of the hub. The ball-race may have a plain or exteriorly-threaded surface where the same is inserted in the end of the hub, and the ball-retainer may be screwed or sprung into connection with the cup-shaped ball-race. The removable reversible sprocket is peculiarly constructed, so as to provide for changing the draft-line of the chain of the cycle in its relation to the sprocket upon the crank-shaft, and the ball-race adjacent to said reversible sprocket becomes a lock-nut therefor.

In the drawings, Figure 1 is a side elevation, Fig. 2 an end elevation, and Fig. 3 a longitudinal section, representing my improvement; and Fig. 4 is a separate section of the sprocket and end of the hub.

The barrel-hub is represented at $a$, and the same is provided with recessed ends and shoulders 2. The inner surfaces of these recessed ends may be plain or screw-threaded, and upon the barrel-hub are the spoke-flanges $a'$ $a'$, and at one end of said barrel-hub the surface 3 is exteriorly threaded to receive the sprocket-wheel $b$, which sprocket-wheel is adapted to be thereon screwed to place. The cup-shaped ball-race $c$ is provided with an integral clamping-flange $c'$, whose peripheral edge may be hexagonal, octagonal, or knurled. This cup-shaped ball-race being in one piece possesses greater strength, rigidity, and durability than some that have heretofore been made, and the exterior surface of said ball-race may be plain or threaded, as desired. The open center of the cup-shaped ball-race $c$ has a shoulder at 4, and the same is adapted to receive the removable ball-retainer $d$. This may be sprung to place in the ball-race against the shoulder 4 or may be screwed to place, at the pleasure of the manufacturer. I prefer to make said removable ball-retainer with an integral flange $d'$, and where said retainer has a threaded edge to be screwed to place to provide the flange $d'$ with notches to receive a key for unscrewing the same to remove and clean the parts.

The sprocket $b$ is detachable from the barrel-hub and reversible, the inner surface of its hub being threaded to screw upon the threaded surface 3 of the hub $a$ in the direction of the arrow, Fig. 2. Said sprocket is preferably provided with recessed faces 5 6, the surface 6 being more deeply recessed than the surface 5. It will also be noticed from the drawings that the plane of the hub-face $b'$ upon the deeply-recessed side of the sprocket is inside of the plane of the side of the sprocket-face and that the plane of the hub-face $b^2$ on the opposite or least-recessed face is outside of the plane of the side of the sprocket-face. In this sprocket the interiorly-threaded hub portion is approximately the same width as the toothed portion, one edge being within the plane of the toothed portion and the other edge about the same amount beyond the plane of the toothed portion upon the other side of the sprocket. The object of this construction is to be able to alter the draft-line of the chain of the cycle, because in some cycles the tread is narrower than in others, and where the tread is narrow the hub-face $b'$ will be brought up against the shoulder of the barrel-hub, as seen in Fig. 3, so as to bring the chain-draft nearer the central plane of the wheel, and where the tread is wider the sprocket will be reversed, so as to bring the hub-face $b^2$ against the shoulder of the barrel, as seen in Fig. 4, and place the sprocket farther away from the central plane of the wheel.

While it is optional with the manufacturer whether the exterior of the cup-shaped ball-race shall be plain or threaded, yet it is necessary at the end of the hub adjacent to the sprocket-wheel $b$ that the exterior of this cup-shaped ball-race should be threaded, so as to act as a clamping-nut to the sprocket. For this purpose it is essential that the sprocket be screwed upon the hub in the direction of the rotation of the cycle-wheel (see arrow, Fig. 2) and that the adjacent cup-shaped ball-race be exteriorly threaded in the reverse direction, so that when screwed to place (see arrow, Fig. 2) the clamping-flange $c'$ will come against the surface of the hub of the sprocket $b$ to hold the same from unscrewing when the rider of the cycle back-pedals.

The axle is shown at $e$, and the stationary cone thereon at $e'$, the detachable adjustable cone at $f$, and the clamping-nuts at $g\ g'$. These parts are of usual construction and do not require further description. I, however, prefer to make the knurled flange of the cones $e'\ f$ recessed at their inner faces, so as to extend over the flange $d'$ of the removable ball-retainers, so as to exclude dust and water from the bearings.

I claim as my invention—

1. In a ball-bearing for cycles, the combination with the hub interiorly threaded at the ends, of a cup-shaped ball-race exteriorly threaded to screw into the end of the hub, and having an integral flange surrounding and extending beyond its open end to come against the end of the hub, and a removable ring-shaped ball-retainer setting within a recess around the outer open edge of the cup-shaped ball-race for holding the balls in position, substantially as specified.

2. In a ball-bearing for cycles, the combination with the hub interiorly threaded at the ends and exteriorly threaded at one end, of a sprocket-wheel screwed upon the exterior thread of the hub, a cup-shaped ball-race exteriorly threaded to screw into the end of the hub and having an integral flange surrounding and extending beyond its open end to come against the end of the hub and against the surface of the sprocket-wheel and acting as a lock-nut, and a removable ring-shaped ball-retainer setting within a recess around the outer open edge of the cup-shaped ball-race for holding the balls in position, substantially as set forth.

Signed by me this 29th day of March, 1897.

JOHN G. BUEHLER.

Witnesses:
GEO. T. PINCKNEY,
S. T. HAVILAND.